United States Patent
Hannwacker et al.

(10) Patent No.: US 10,378,771 B2
(45) Date of Patent: Aug. 13, 2019

(54) COMBUSTOR ASSEMBLY

(71) Applicant: General Electric Company, Schenectady, NY (US)

(72) Inventors: David Andrew Hannwacker, Torrance, CA (US); Stephen John Howell, West Newbury, MA (US); John Carl Jacobson, Melrose, MA (US)

(73) Assignee: General Electric Company, Schenectady, NY (US)

( * ) Notice: Subject to any disclaimer, the term of this patent is extended or adjusted under 35 U.S.C. 154(b) by 460 days.

(21) Appl. No.: 15/053,484

(22) Filed: Feb. 25, 2016

(65) Prior Publication Data

US 2017/0248316 A1    Aug. 31, 2017

(51) Int. Cl.
| | |
|---|---|
| *F23R 3/50* | (2006.01) |
| *F23R 3/60* | (2006.01) |
| *F02C 7/20* | (2006.01) |
| *F23R 3/00* | (2006.01) |

(52) U.S. Cl.
CPC ............... *F23R 3/007* (2013.01); *F02C 7/20* (2013.01); *F23R 3/50* (2013.01); *F23R 3/60* (2013.01)

(58) Field of Classification Search
CPC .... F23R 3/007; F23R 3/50; F23R 3/60; F23R 3/002; F23R 2900/00017; F23R 2900/00005; F02C 7/20; F05D 2240/91; F05D 2260/31
See application file for complete search history.

(56) References Cited

U.S. PATENT DOCUMENTS

| | | | |
|---|---|---|---|
| 5,265,409 A | 11/1993 | Smith, Jr. et al. | |
| 5,291,732 A | 3/1994 | Halila | |
| 5,353,587 A | 10/1994 | Halila | |
| 5,363,643 A | 11/1994 | Halila | |
| 5,702,214 A | 12/1997 | Duran | |
| 6,334,298 B1 | 1/2002 | Aicholtz | |
| 6,449,952 B1 | 9/2002 | Emilianowicz et al. | |

(Continued)

FOREIGN PATENT DOCUMENTS

| | | |
|---|---|---|
| CN | 1576698 A | 2/2005 |
| CN | 1609427 A | 4/2005 |

(Continued)

OTHER PUBLICATIONS

Extended European Search Report and Opinion issued in connection with corresponding EP Application No. 16206147.7 dated Jul. 31, 2017.

(Continued)

*Primary Examiner* — Andrew H Nguyen
(74) *Attorney, Agent, or Firm* — Dority & Manning, P.A.

(57) ABSTRACT

A combustor assembly for a gas turbine engine includes a combustor dome and a combustion chamber liner attached to or formed integrally with the combustor dome. The combustion chamber liner extends between a forward end and an aft end, and together with the combustor dome at least partially defines a combustion chamber. The combustor assembly additionally includes a mounting assembly attached to the liner proximate the forward end of the liner for supporting the combustor dome and combustion chamber liner within the gas turbine engine relative to a structural component of the gas turbine engine.

17 Claims, 5 Drawing Sheets

(56) References Cited

U.S. PATENT DOCUMENTS

| | | | |
|---|---|---|---|
| 6,668,559 B2 * | 12/2003 | Calvez | F23R 3/007 60/753 |
| 8,141,371 B1 | 3/2012 | Habarou et al. | |
| 8,863,528 B2 | 10/2014 | Shi et al. | |
| 2002/0108378 A1 | 8/2002 | Ariyoshi et al. | |
| 2002/0184888 A1 | 12/2002 | Calvez et al. | |
| 2004/0118122 A1 * | 6/2004 | Mitchell | F23R 3/007 60/752 |
| 2006/0032237 A1 | 2/2006 | Aumont et al. | |
| 2014/0360196 A1 | 12/2014 | Graves et al. | |
| 2017/0059167 A1 | 3/2017 | Bloom et al. | |
| 2017/0248315 A1 | 8/2017 | Hannwacker et al. | |

FOREIGN PATENT DOCUMENTS

| | | |
|---|---|---|
| EP | 0 584 906 A2 | 3/1994 |
| EP | 1 439 350 A2 | 7/2004 |
| EP | 1 445 537 A2 | 8/2004 |
| EP | 1 486 732 A2 | 12/2004 |
| FR | 2825778 A1 | 12/2002 |
| FR | 2896575 A1 | 7/2007 |
| JP | 2002-364850 A | 12/2002 |
| JP | 2006-002765 A | 1/2006 |
| JP | 2011-237169 A | 11/2011 |

OTHER PUBLICATIONS

Machine Translation and Notification of Reasons for Refusal issued in connection with corresponding JP Application No. 2016-245008 dated Jan. 16, 2018.

Office Action issued in connection with corresponding EP Application No. 16206147.7 dated Aug. 8, 2018.

First Office Action and Search issued in connection with corresponding CN Application No. 201611205418.1 dated Dec. 11, 2018 (English Translation Unavailable).

* cited by examiner

COMBUSTOR ASSEMBLY

FEDERALLY SPONSORED RESEARCH

This invention was made with government support under contract number W911W6-11-2-0009 of the U.S. Army. The government may have certain rights in the invention.

FIELD OF THE INVENTION

The present subject matter relates generally to a gas turbine engine, or more particularly to a combustor assembly for a gas turbine engine.

BACKGROUND OF THE INVENTION

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

More commonly, non-traditional high temperature materials, such as ceramic matrix composite (CMC) materials, are being used as structural components within gas turbine engines. For example, given an ability for CMC materials to withstand relatively extreme temperatures, there is particular interest in replacing components within the combustion section of the gas turbine engine with CMC materials. For example, typical combustion sections include an inner liner, an outer liner, and a dome. More commonly, the inner and outer liners are being formed of CMC materials, while the dome is formed of a metal material.

However, certain gas turbine engines have had problems accommodating certain mechanical properties of the CMC materials incorporated therein. For example, CMC materials have different coefficients of thermal expansion than the traditional metal materials. Therefore, the attachment of the inner and outer CMC liners to the metal dome may require a fairly complicated attachment assembly. Additionally, such a configuration may complicate mounting of the combustor assembly within the gas turbine engine, given that a majority of the components surrounding the combustor assembly are formed of a metal material.

Accordingly, a combustor assembly capable of being mounted within a gas turbine engine in a manner to allow an anticipated amount of thermal expansion of the CMC components would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a combustor assembly for a gas turbine engine defining an axial direction and including structural component is provided. The combustor assembly includes a combustor dome and a liner attached to or formed integrally with the combustor dome. The liner extends between a forward end and an aft end. The combustor dome and liner together define at least in part a combustion chamber. The combustor assembly additionally includes a mounting assembly attached to the liner proximate the forward end of the liner for supporting the combustor dome and liner within the gas turbine engine relative to the structural component of the gas turbine engine.

In another exemplary embodiment of the present disclosure, a gas turbine engine defining an axial direction and a circumferential direction is provided. The gas turbine engine includes a compressor section, a turbine section, and a combustion section disposed between the compressor section and the turbine section. The combustion section includes a combustor assembly, and the combustor assembly includes a combustor dome and a liner extending between a forward end and an aft end. The combustor dome and liner together define at least in part a combustion chamber. The combustor assembly additionally includes a mounting assembly including a support member extending between a forward end and an aft end. The forward end of the support member is attached to the liner proximate the forward end of the liner and the aft end of the support member is attached to a structural component of the gas turbine engine to support the combustor assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
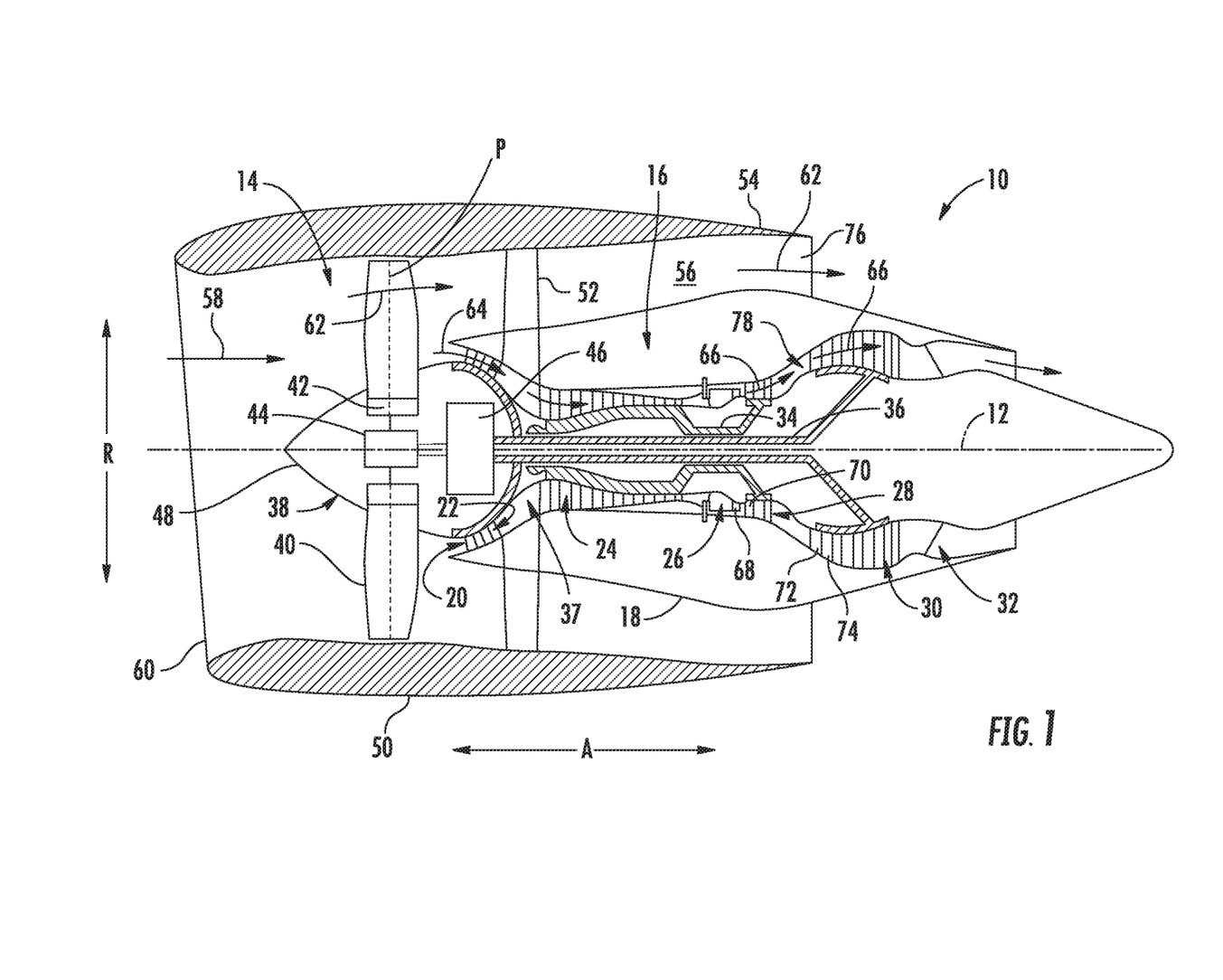
FIG. 1 is a schematic cross-sectional view of an exemplary gas turbine engine according to various embodiments of the present subject matter.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (not shown) extending about the axial direction A. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases and the core turbine engine 16 includes, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is provided by way of example only, and that in other exemplary embodiments, the turbofan engine 10 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine.

Figure 2:
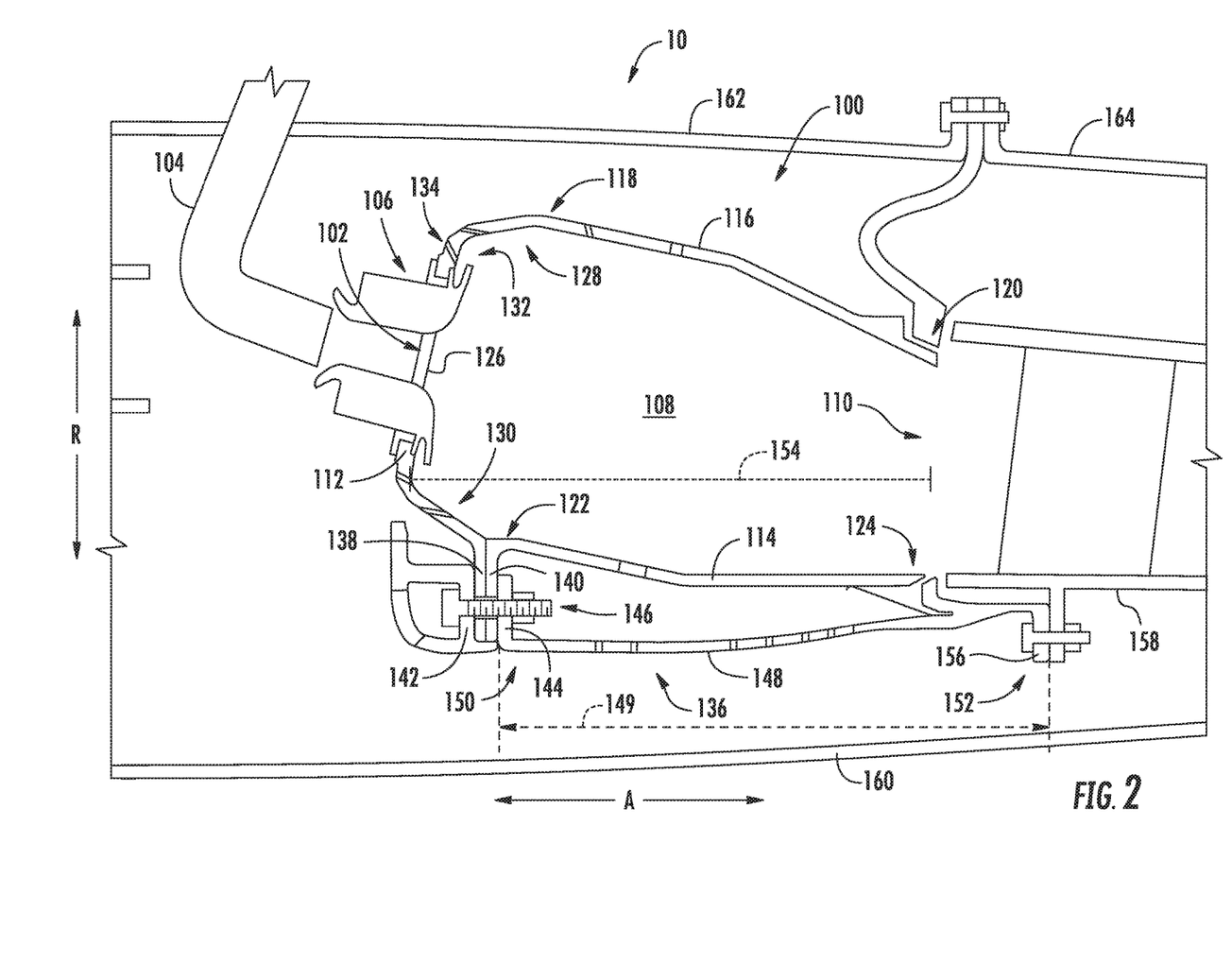
FIG. 2 is a side, sectional view of a combustor assembly in accordance with an exemplary embodiment of the present disclosure positioned in a combustion section of the exemplary gas turbine engine of FIG. 1.

Referring now to FIG. 2, a side, cross-sectional view is provided of a combustor assembly 100 mounted within the combustion section 26 the turbofan engine 10 of FIG. 1. As shown, the combustor assembly 100 is located within the combustion section 26—downstream of the compressor section and upstream of the turbine section. As will be discussed in greater detail below, the combustor assembly 100 generally defines a plurality of openings 102 at a forward end through which the combustor assembly 100 is configured to receive a flow of compressed air (from the compressor section) and fuel (e.g., from a fuel nozzle 104). The fuel and compressed air is mixed using one or more fuel-air injection hardware assemblies 106. The mixtures is then provided to a combustion chamber 108 of the combustor assembly 100 wherein such fuel-air mixture is combusted to generate combustion gases. Such combustion gases are provided through an outlet 110 of the combustor assembly 100 and into the turbine section for driving the turbine section.

The combustor assembly 100 generally includes a first combustion chamber member and a second combustion chamber member. For the embodiment depicted, the first combustion chamber member is configured as a combustor dome 112 and the second combustion chamber member is configured as a combustion chamber liner. Specifically for the embodiment depicted, the combustion chamber liner is configured as a combustion chamber inner liner 114. Additionally, the combustor assembly 100 includes a third combustion chamber member, which for the embodiment depicted is configured as an combustion chamber outer liner 116. Notably, for the exemplary embodiment depicted, the combustion chamber outer liner 116 and combustor dome 112 are formed integrally of a single, continuous piece of material. However, in other embodiments, the combustion chamber outer liner 116 and combustor dome 112 may instead be formed separately.

Referring still to FIG. 2, the first and second combustion chamber members, i.e., the combustor dome 112 and combustion chamber inner liner 114, as well as the combustion chamber outer liner 116, are each formed of a ceramic matrix composite ("CMC") material. CMC material is a non-metallic material having high temperature capability. Exemplary CMC materials utilized for the combustor dome 112 and combustion chamber liners (e.g., the inner liner 114 and outer liner 116) may include silicon carbide, silicon, silica or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite).

Additionally, the combustor dome 112 (and integrally formed combustion chamber outer liner 116) and combustion chamber inner liner 114 each extend substantially continuously along the circumferential direction C to define an annular shape, as will be more clearly shown in the embodiment of FIG. 3, discussed below. As will also be discussed in greater detail below, the combustion chamber inner liner 114 is joined to the combustor dome 112, such that the combustion chamber inner liner 114 and the integrally formed combustion chamber outer liner 116 and combustor dome 112 together define an annular combustion chamber 108. Accordingly, the exemplary combustor assembly 100 depicted is configured as an annular combustor.

Referring still to FIG. 2, the combustion chamber outer liner 116 and combustion chamber inner liner 114 each extend generally along the axial direction A—the combustion chamber outer liner 116 extending between a forward end 118 and an aft end 120 and the combustion chamber inner liner 114 similarly extending between a forward end 122 and an aft end 124. Additionally, the combustor dome 112 includes a back wall 126 and a transition portion. Specifically, the combustor dome 112 depicted includes an outer transition portion 128 and an inner transition portion 130. The outer transition portion 128 is positioned along an outer edge of the back wall 126 along the radial direction R and the inner transition portion 130 is positioned along an inner edge of the back wall 126 along the radial direction R.

The inner and outer transition portions 128, 130 each extend circumferentially with the back wall 126 of the combustor dome 112 (see a FIG. 2).

The outer transition portion 128 extends from the back wall 126 towards the outer liner 116 and the inner transition portion 130 extends from the back wall 126 towards the inner liner 114. As stated, for the embodiment depicted the outer liner 116 is formed integrally with the combustor dome 112 (including the back wall 126 and the outer transition portion 128), and thus the outer transition portion 128 extends seamlessly from the back wall 126 to the outer liner 116. For example, the combustor dome 112 and combustion chamber outer liner 116 together define a continuous and seamless surface extending from the combustor dome 112 to the combustion chamber outer liner 116.

Referring still to FIG. 2, and as briefly stated above, the combustor dome 112 additionally defines an opening 102 and the combustor assembly 100 includes a fuel-air injector hardware assembly 106. More particularly, the combustor dome 112 defines a plurality of openings 102 and the combustor assembly 100 includes a respective plurality of fuel-air injector hardware assemblies 106—each opening 102 configured for receiving a respective one of the plurality of fuel-air injector hardware assemblies 106 (see, e.g., FIG. 3, below).

The plurality of fuel-air injector hardware assemblies 106 may each include, e.g., a swirler and/or a baffle. As briefly stated above, the fuel-air injector hardware assemblies 106 are configured to receive a flow of combustible fuel from the fuel nozzle 104 and compressed air from a compressor section of the turbofan engine 10. Each fuel-air injector hardware assembly 106 is attached directly to the combustor dome 112 at a respective one of the plurality of openings 102. Additionally, as is depicted, each fuel-air injector hardware assembly 106 extends into or through such opening 102. More particularly, the combustor dome 112 defines a hot side 132 exposed to the combustion chamber 108 and an opposite cold side 134. The exemplary fuel-air injector hardware assemblies 106 are each attached directly to the hot side 132 of the combustor dome 112 and directly to the cold side 134 of the combustor dome 112. As will be more evident in, e.g., FIG. 3 below, for the embodiment depicted each fuel-air injector hardware assembly 106 is attached directly to the combustor dome 112 independently of the other fuel-air injector hardware assemblies 106, or more specifically of the adjacent fuel-air injector hardware assemblies 106. For example, as the combustor dome 112 of the combustor assembly 100 depicted extends continuously along the circumferential direction C, no additional or supplemental supports are required for the combustor dome 112 and plurality of fuel-air injector hardware assemblies 106.

Referring still to FIG. 2, by contrast to the integrally formed combustion chamber outer liner 116 and combustor dome 112, for the embodiment depicted the combustion chamber inner liner 114 is formed separately from the combustor dome 112 and combustion chamber outer liner 116. The combustion chamber inner liner 114 is attached to the combustor dome 112 generally through a mounting assembly 136. Specifically, the first combustion chamber member, i.e., the combustor dome 112, includes a first coupling flange 138 and the second combustion chamber member, i.e., the combustion chamber inner liner 114, includes a second coupling flange 140. The first and second coupling flanges 138, 140 are positioned adjacent to one another and each extend generally outward from the combustion chamber 108. Specifically, for the embodiment depicted, the first and second coupling flanges 138, 140 extend inwardly generally along the radial direction R.

Moreover, the exemplary mounting assembly 136 depicted includes a first mounting flange 142 and a second mounting flange 144. The first mounting flange 142 is positioned adjacent to the first coupling flange 138 of the combustor dome 112 and the second mounting flange 144 is positioned adjacent to the second coupling flange 140 of the combustion chamber inner liner 114. Moreover, the mounting assembly 136 further includes an attachment member 146 for pressing the first mounting flange 142 towards the second mounting flange 144 to attach the combustor dome 112 and combustion chamber inner liner 114. For example, the attachment member 146 may clamp the first mounting flange 142 and second mounting flange 144 together to attach the combustor dome 112 and combustion chamber outer liner 114.

Accordingly, the mounting assembly 136 is attached to the combustion chamber outer liner 116 and the combustor dome 112. More specifically, for the embodiment depicted the mounting assembly 136 is attached to the combustion chamber inner liner 114 proximate the forward end 122 of the combustion chamber inner liner 114 for supporting the combustor dome 112 and combustion chamber inner liner 114 within the turbofan engine 10 relative to a structural component of the turbofan engine 10. For example, the exemplary mounting assembly 136 depicted includes a support member 148 defining a length 149 extending from a forward end 150 to an aft end 152 generally along the axial direction A. The forward end 150 of the support member 148 includes the second mounting flange 144 and, as stated and as will be discussed in further detail below, is attached to the combustion chamber inner liner 114 proximate the forward end 122 of the combustion chamber inner liner 114.

As used herein, the term "proximate the forward end" may refer to generally to a location closer to a forward end than an aft end. Accordingly, for example, the combustor assembly 100 may define a length 154 generally along the axial direction A between one or more of the openings 102 and the outlet 110 to the turbine section. The mounting assembly 136 may be attached to the combustion chamber inner liner 114 within at least about the forward 50% of the combustor assembly length 154. More particularly, for the embodiment depicted, the mounting assembly 136 may be attached to the combustion chamber inner liner 114 within at least about the forward 40% of the combustor assembly length 154, within at least about the forward 30% of the combustor assembly length 154, or within at least about the forward 20% of the combustor assembly length 154. It should be appreciated, that as used herein, terms of approximation, such as "about" or "approximately," refer to being within a 10% margin of error.

As stated, the mounting assembly 136 is configured for supporting the combustor dome 112, the combustion chamber inner liner 114, and the combustion chamber outer liner 116 within the turbofan engine 10. Specifically, the exemplary support member 148 is configured for attachment to a structural component of the turbofan engine 10 at the aft end 152. More particularly, the support member 148 includes an attachment flange 156 through which the support member 148 is attached to the structural component of the turbofan engine 10 to support the combustor assembly 100. For the embodiment depicted, the structural component is configured as a turbine frame 158 at least partially defining a flowpath through the turbine section. However, in other embodiments, the structural component may be any static structural member within the turbofan engine 10. For example, in other embodiments, the structural component may be an inner compressor casing 160, an outer compressor casing 162, a turbine casing 164, etc.

As will be discussed in greater detail below with reference to the exemplary embodiment of FIGS. 3 through 5, the mounting assembly 136 may be formed of a metal material. More particularly, the support member 148, including the second coupling flange 140, and the first coupling flange 138 may each be formed of a metal material. Such a configuration may allow for a desired amount of thermal growth during operation of the turbofan engine 10. More particularly, as the combustion chamber inner and outer liners 114, 116 and combustor dome 112 are all supported through the mounting assembly 136 at forward end 122 of the combustion chamber inner liner 114, a distance between the fuel-air injector hardware assembly 106 and an inlet to the turbine section will be dictated substantially by an amount of thermal growth of the mounting assembly 136. Further, as the various other components surrounding the combustor assembly 100, such as the inner and outer compressor casings 160, 162 and turbine casing 164, are all also formed of a metal material, the thermal growth of the mounting assembly 136 will likely match a thermal growth of such components and ensure the combustor assembly 100 is in a desired location within the turbofan engine 10, despite a mismatched thermal growth between the CMC components of the combustor assembly 100 and the mounting assembly 136.

Figure 3:
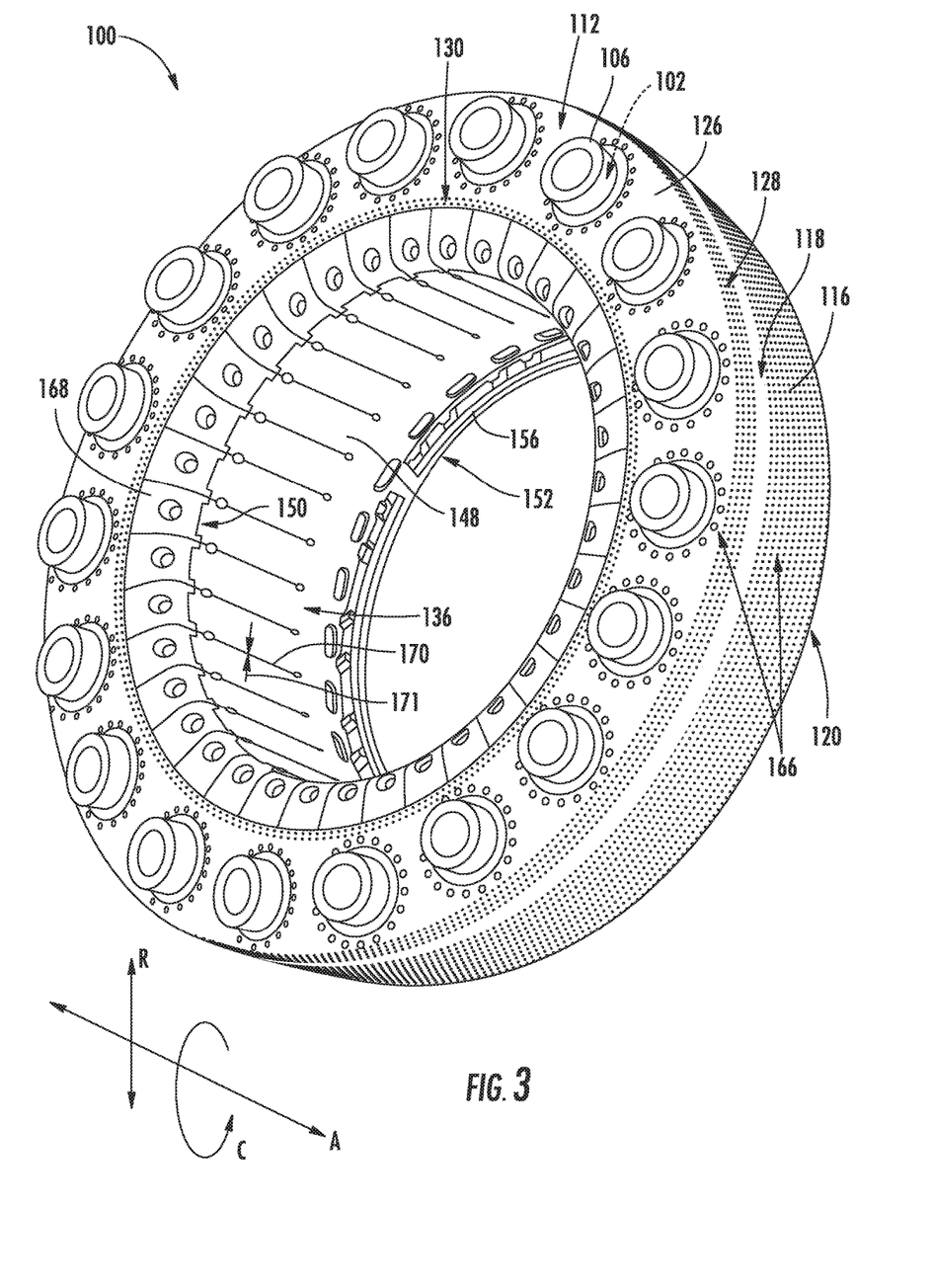
FIG. 3 is a perspective view of a combustor assembly in accordance with another exemplary embodiment of the present disclosure.
Figure 4:
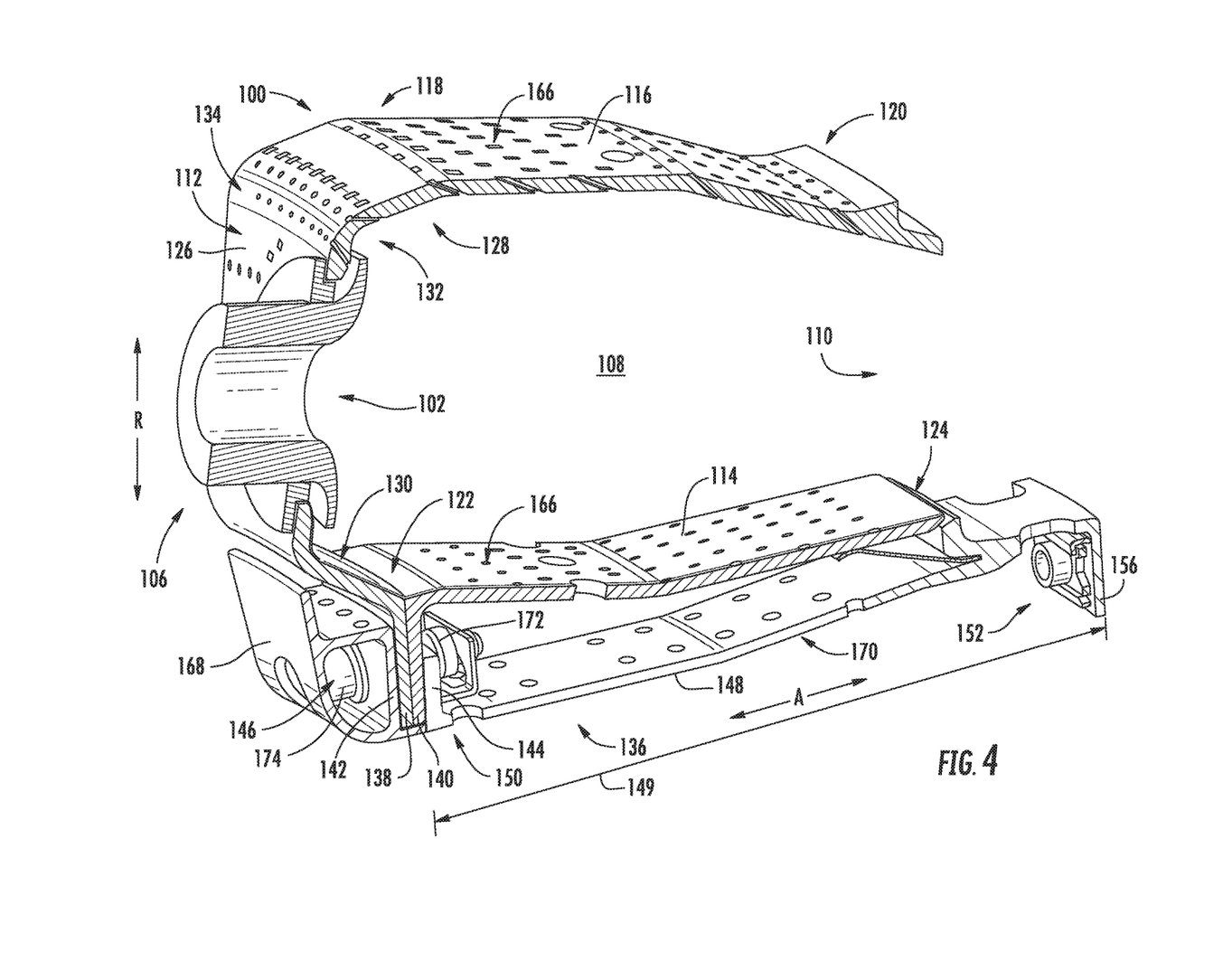
FIG. 4 is a perspective, cross-sectional view of a section of the exemplary combustor assembly of FIG. 3.
Figure 5:
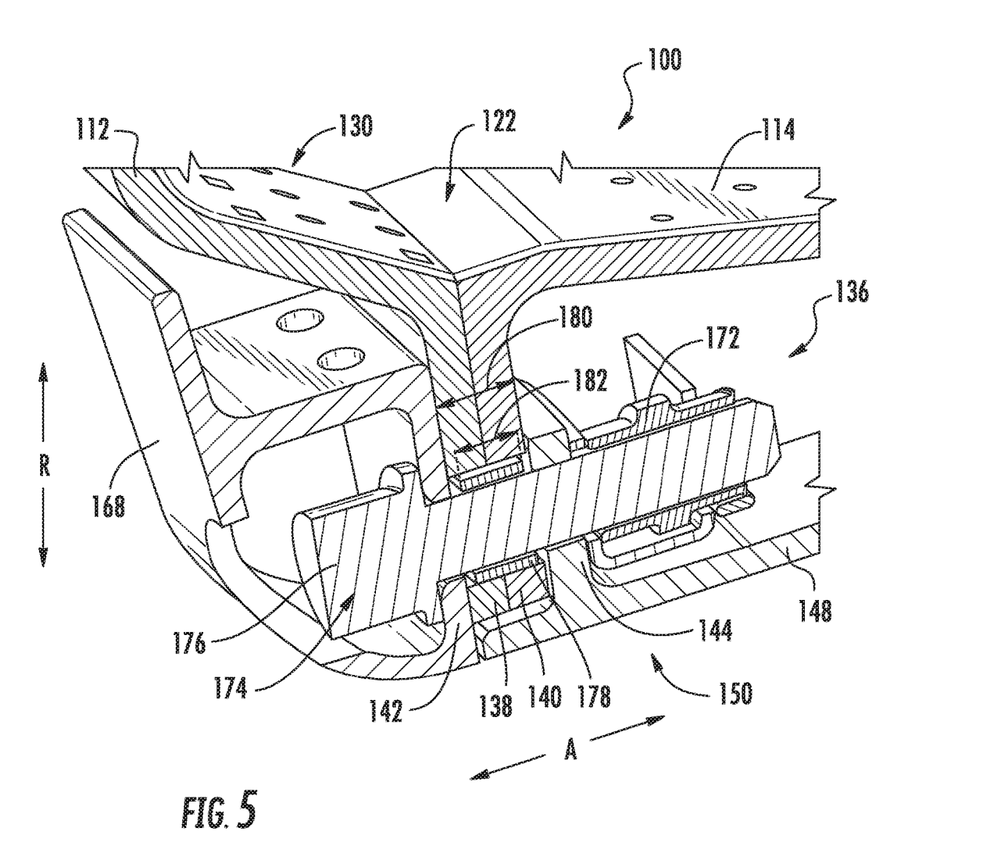
FIG. 5 is a close-up, perspective, cross-sectional view of an attachment portion of the exemplary combustor assembly of FIG. 3.

Referring now to FIGS. 3 through 5, various views of a combustor assembly 100 in accordance with an exemplary embodiment of the present disclosure are provided. The exemplary combustor assembly 100 of FIGS. 3 through 5 may be configured in substantially the same manner as exemplary combustor assembly 100 of FIG. 2, and accordingly, the same or similar numbering may refer to the same or similar parts. Specifically, FIG. 3 provides a perspective view of an assembled combustor assembly 100; FIG. 4 provides a perspective, cross-sectional view of a section of the exemplary combustor assembly 100 of FIG. 3; and FIG. 5 provides a close-up, cross-sectional view of an attachment portion of a mounting assembly 136 of the exemplary combustor assembly 100 of FIG. 3.

As may be seen most clearly in FIG. 3, the combustor assembly 100 includes a plurality of cooling holes 166 extending through one or more of the combustion chamber members to allow a flow of cooling air therethrough. Specifically, the exemplary combustor assembly 100 depicted includes a plurality of cooling holes 166 extending through the combustion chamber outer liner 116, the combustion chamber inner liner 114, and the combustor dome 112 to allow for an amount of cooling air to flow therethrough. The cooling air may be provided from a compressor section of a gas turbine engine into which the combustor assembly 100 is installed.

As previously stated, the combustor assembly 100 is generally configured as an annular combustor. Accordingly, the combustion chamber outer liner 116, the combustor dome 112 (formed integrally with the combustion chamber outer liner 116 for the embodiment depicted), and combustion chamber inner liner 114 (see, e.g., FIG. 4) each extend substantially continuously along the circumferential direction C to define an annular shape. Although not depicted in FIG. 3, the first coupling flange 138 (of the combustor dome 112) and the second coupling flange 140 (of the combustion chamber inner liner 114) also extend substantially continuously in the circumferential direction. Further, the mounting assembly 136, and more particularly, the first mounting flange 142 and the support member 148, including the second mounting flange 144, each also extend substantially continuously along the circumferential direction C to define an annular shape. Thus, the support member 148 may be referred to as an annular support member 148. Notably, the first mounting flange 142 is formed of a plurality of individual mounting brackets 168 circumferentially arranged adjacent to one another.

For the embodiment depicted, the mounting assembly 136 is formed generally of a metal material, as compared to the combustion chamber inner liner 114, combustor dome 112, and combustion chamber outer liner 116, which may each be formed of a CMC material. Accordingly, the mounting brackets 168 forming the first mounting flange 142 of the mounting assembly 136 are formed of metal material, as is the support member 148, including the second mounting flange 144. In order to accommodate a mismatch in coefficients of thermal expansion, the support member 148 includes a plurality of gaps 170 extending generally along the axial direction A. However, in other embodiments, the plurality of gaps 170 may instead extend in any other suitable direction. Notably, inclusion of the plurality of gaps 170 may additionally provide vibration dampening and other benefits to the combustor assembly 100.

Moreover, the plurality of gaps 170 depicted each extend along at least about fifty percent of the length 149 of the support member 148. Specifically for the embodiment depicted, each of the plurality of gaps 170 extend along at least about sixty percent of the length 149 of the support member 148. Further, each gap 170 in the plurality of gaps 170 defines a width 171 (FIG. 3). As the gaps 170 depicted extend generally along the axial direction A, the width 171 is defined generally along the circumferential direction C. The width 171 of each gap 170 may be at least about 0.05 inches, at least about 0.10 inches, at least about 0.20 inches, or any other suitable width. The gaps 170 allow for relative expansion of at least one of the combustion chamber outer liner 116 or combustor dome 112 relative to the support member 148 of the mounting assembly 136. More particularly, the gaps 170 allow for relative expansion of each of the CMC components, i.e., the combustion chamber inner liner 114, the combustor dome 112, and combustion chamber outer liner 116, relative to the support member 148 of the mounting assembly 136 generally along the radial direction R.

Referring now particularly to FIGS. 4 and 5, the exemplary attachment member 146 is configured as a nut 172 and bolt 174, or rather a plurality of nuts 172 and bolts 174, each bolt 174 extending through the first and second mounting flanges 142, 144 as well as the first and second coupling flanges 138, 140. The bolts 174 each include a head 176 pressing against the first mounting flange 142, and each of the respective nuts 172 are threadably engaged with the respective bolt 174, pressing against the second mounting flange 144. With such a configuration, the force attaching the first and second coupling flanges 138, 140 of the combustor dome 112 and combustion chamber inner liner 114, respectively, is distributed amongst an inner surface area of the first mounting flange 142 and of the second mounting flange 144. Accordingly, the first and second coupling flanges 138, 140 are pressed together with a minimal amount of point force applied thereto. Such a configuration may limit damage to the first and second coupling flanges 138, 140.

Moreover, as may be seen in the cross-sectional view of FIG. 5, the mounting assembly 136 further includes a bushing 178, or rather a plurality of bushings 178, each bushing 178 extending around the respective bolt 174 within the first and second coupling flanges 138, 140. The bushings 178 may act as a barrier between the bolts 174 (formed of a metal material) and the first and second coupling flanges 138, 140 (formed of CMC materials). Accordingly, any wear on the metal materials from the CMC materials will be absorbed by the bushings 178 as opposed to the bolts 174. Notably, the first and second coupling flanges 138, 140 together define a combined width 180 and each of the bushings similarly define a length 182. For the embodiment depicted, the length 182 of each of the bushings 178 is less than the combined width 180 of the first and second coupling flanges 138, 140 to allow for relative thermal expansions between the bushing 178, which may be formed of a metal material, and the first and second coupling flanges 138, 140.

Inclusion of the bushing 178, first mounting flange 142, and second mounting flange 144 may allow for a more durable attachment of the combustor dome 112 to the combustion chamber inner liner 114. More specifically, inclusion of such metal components between the metal bolt 174 and the CMC dome 112 and inner liner 114 may reduce a risk of premature wear to the bolt 174 during operation of the combustor assembly 100.

It should be appreciated, however, that the exemplary combustor assembly 100 described herein is provided by way of example only and that in other exemplary embodiments of the present disclosure, the combustor assembly 100 may have any other suitable configuration. For example, in other exemplary embodiments, the combustion chamber outer liner 116 may not be formed integrally with the combustor dome 112, and instead may be attached to the combustor dome 112 in any suitable manner. Further, in certain exemplary embodiments, the combustion chamber inner liner 114 may be integrally formed with the combustor dome 112 instead of or in addition to the combustion chamber outer liner 116. Moreover, in still other embodiments, the combustor dome 112 may have any other suitable configuration. For example, in certain embodiments, the combustor dome 112 may not include one or both of the outer transition portion 128 or the inner transition portion 130. Or alternatively, one or both of the outer transition portion 128 or the inner transition portion 130 may be configured in any other suitable manner.

Moreover, although for the embodiments described herein the mounting assembly 136 is located generally at a radially inner location of the combustor assembly 100, in other embodiments, the mounting assembly 136 may instead be located at a radially outer location. For example, in such an exemplary embodiment, the mounting assembly 136 may be configured to attach a combustion chamber outer liner 116 to a separately formed combustion chamber 108 dome. Moreover, although for the embodiment depicted, the mounting assembly 136 attaches to the combustion chamber liner and dome at a forward end of the combustion chamber liner, in other embodiments, the mounting assembly 136 may instead attach to, e.g., a combustion chamber liner at an aft end of the combustion chamber liner, or any other suitable location. Further, in still other embodiments the mounting assembly 136, including the support member 148, may extend forward from the coupling flanges 138, 140 (as opposed to extending aft as in the embodiments depicted) to a support member within the gas turbine engine located forward of the coupling flanges 138, 140.

Furthermore, although for the embodiment depicted, the various components defining the combustion chamber 108 extend substantially continuously along the circumferential direction C to define an annular shape, in other exemplary embodiments, such components may instead include a plurality of components spaced along the circumferential direction C to define the combustion chamber 108. Additionally, or alternatively, in other embodiments, the combustor assembly 100 may have any other suitable fuel-air injector hardware assemblies 106 mounted to the combustor dome 112 in any other suitable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine defining an axial direction and a radial direction and including a structural component, the combustor assembly comprising:
    a combustor dome;
    a liner attached to or formed integrally with the combustor dome and extending between a forward end and an aft end, the combustor dome and liner together defining at least in part a combustion chamber, the liner defining a coupling flange extending outward from the combustion chamber generally along the radial direction; and
    a mounting assembly attached to the coupling flange of the liner proximate the forward end of the liner for supporting the combustor dome and liner within the gas turbine engine relative to the structural component of the gas turbine engine;
    wherein the mounting assembly includes a support member extending from a forward end to an aft end, wherein the forward end of the support member is attached to the liner proximate the forward end of the liner, and wherein the aft end of the support member is configured for attachment to the structural component of the gas turbine engine;
    wherein the support member is comprised of a metal material, wherein the liner is comprised of a ceramic matrix composite material, and wherein the combustor dome is comprised of a ceramic matrix composite material; and
    wherein the mounting assembly includes a fastener extending through the coupling flange of the liner.

2. The combustor assembly of claim 1, wherein the support member extends substantially continuously along a circumferential direction to define an annular shape.

3. The combustor assembly of claim 2, wherein the support member includes a plurality of gaps extending generally along the axial direction to allow for thermal expansion of at least one of the liner or the combustor dome relative to the support member of the mounting assembly.

4. The combustor assembly of claim 2, wherein the support member defines a length along the axial direction, wherein the support member includes a plurality of gaps, and wherein each of the plurality of gaps extend along at least about fifty percent of the length of the support member.

5. The combustor assembly of claim 2, wherein the support member includes a plurality of gaps to allow for thermal expansion of at least one of the liner or the combustor dome relative to the support member of the mounting assembly, and wherein each of the plurality of gaps define a minimum width of at least about 0.05 inches.

6. The combustor assembly of claim 1, wherein the coupling flange is positioned at the forward end of the liner, wherein the combustor dome also includes a coupling flange extending outward relative to the combustion chamber generally along the radial direction and positioned adjacent to the coupling flange of the liner, and wherein the mounting assembly attaches the coupling flange of the liner to the coupling flange of the combustor dome.

7. The combustor assembly of claim 6, wherein the mounting assembly comprises a second mounting flange positioned adjacent to the coupling flange of the liner and a first mounting flange positioned adjacent to the coupling flange of the combustor dome, and wherein the mounting assembly further comprises an attachment member for pressing the first mounting flange towards the second mounting flange to attach the liner to the combustor dome.

8. The combustor assembly of claim 7, wherein the support member includes the second mounting flange at the forward end of the support member.

9. The combustor assembly of claim 1, wherein the liner is an inner liner.

10. A gas turbine engine defining an axial direction, a radial direction, and a circumferential direction, the gas turbine engine comprising:
    a compressor section;
    a turbine section;
    a combustion section disposed between the compressor section and the turbine section, the combustion section comprising a combustor assembly, the combustor assembly comprising a combustor dome and a liner extending between a forward end and an aft end, the combustor dome and liner together defining at least in part a combustion chamber, the liner defining a coupling flange extending outward from the combustion chamber generally along the radial direction; and
    a mounting assembly including a support member extending between a forward end and an aft end, the forward end of the support member attached to the liner proximate the forward end of the liner and the aft end of the support member attached to a structural component of the gas turbine engine to support the combustor assembly, wherein the mounting assembly includes a fastener extending through the coupling flange of the liner;
    wherein the support member is comprised of a metal material, wherein the liner is comprised of a ceramic matrix composite material, and wherein the combustor dome is comprised of a ceramic matrix composite material.

11. The gas turbine engine of claim 10, wherein the support member extends substantially continuously along the circumferential direction to define an annular shape.

12. The gas turbine engine of claim 10, wherein the support member includes a plurality of gaps extending generally along the axial direction to allow for expansion of at least one of the liner or the combustor dome relative to the support member of the mounting assembly.

13. The gas turbine engine of claim 10, wherein the structural component is configured as at least one of an inner combustor casing, an outer combustor casing, a turbine casing, or a turbine frame member.

14. The gas turbine engine of claim 10, wherein the combustor dome includes a coupling flange extending outward relative to the combustion chamber and positioned adjacent to the coupling flange of the liner, and wherein the mounting assembly attaches the coupling flange of the liner to the coupling flange of the combustor dome.

15. The gas turbine engine of claim 14, wherein the mounting assembly comprises a second mounting flange positioned adjacent to the coupling flange of the liner, wherein the support member comprises a first mounting flange positioned adjacent to the coupling flange of the combustor dome, and wherein the mounting assembly further comprises an attachment member for pressing the first mounting flange towards the second mounting flange to attach the liner to the combustor dome.

16. The combustor assembly of claim 1, wherein the combustor assembly defines a length generally along the axial direction, and wherein the mounting assembly is attached to the liner within at least about the forward thirty percent of the combustor assembly length.

17. The gas turbine engine of claim 10, wherein the forward end of the support member is attached to the coupling flange of the liner proximate the forward end of the liner.

\* \* \* \* \*